May 13, 1952 H. R. GROSS ET AL 2,596,237

MOUNTING FOR CIRCUIT ELEMENTS

Filed May 6, 1949

INVENTORS
H. R. GROSS
H. R. MASSINGHAM
BY W. C. Parnell
ATTORNEY

Patented May 13, 1952

2,596,237

UNITED STATES PATENT OFFICE 2,596,237

MOUNTING FOR CIRCUIT ELEMENTS

Herbert R. Gross, Caldwell, and Henry R. Massingham, Westfield, N. J., assignors to Western Electric Company, Incorporated, New York, N. Y., a corporation of New York Application May 6, 1949, Serial No. 91,744

2 Claims. (Cl. 175—298)

This invention relates to mountings for circuit elements, and it is an object of this invention to provide a mounting which is simple in design and inexpensive to make.

In the manufacture of radios and other types of electrical apparatus, it is often desirable, from the standpoint of cost and simplicity of assembly, to mount circuit components such as resistors, condensers, coils and similar parts in a centralized location. These components are then connected through suitable leads to their respective parts of the apparatus circuit.

One usual way of accomplishing this has been to mount these elements on a so-called "resistance card." In this scheme the short component leads are soldered to terminals which are mounted in two corresponding rows on opposite sides of the card. Leads connecting the components to their place in the circuit are then soldered to the appropriate terminals.

The "resistance card" and similar methods have the disadvantage of not being adapted to mass production, particularly in regard to mounting the terminals on the card and to connecting the circuit component leads to these terminals.

Applicants have devised a new method of mounting these circuit components, involving the use of two separate transparent plastic strips. One layer of elements is sealed into the top edges of two parallel strips by the application of heat, and, on inverting the assembly at this stage, this first layer serves to keep the assembly rigid and to hold the two strips in spaced relation while a second layer of components is heat-sealed into the two opposite edges of the strips. This invention is well adapted to production on a large scale.

Other objects and features will appear from the following description, taken in connection with the accompanying drawing in which.

Figure 1:
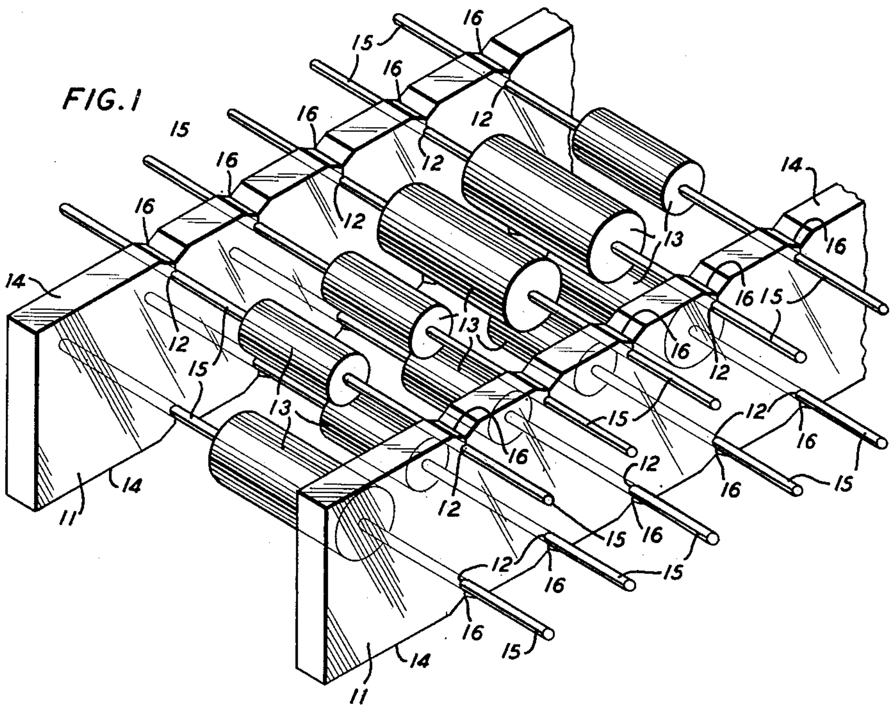
Fig. 1 is a perspective view of a pair of slotted plastic mounting strips showing two layers of circuit components mounted thereon.
Figures 2, 3:
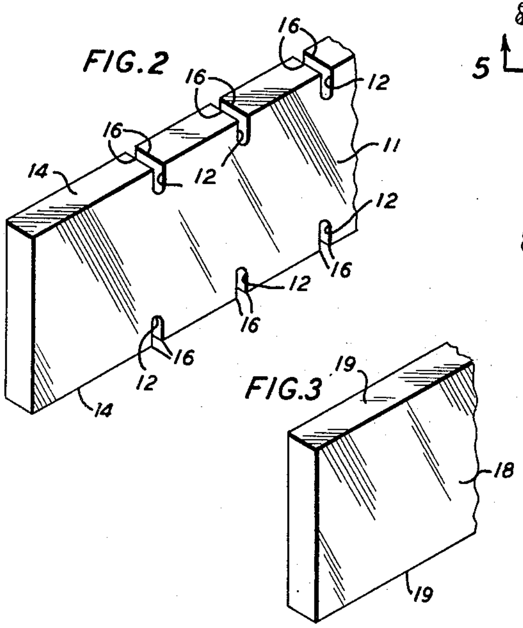
Fig. 2 is a perspective view of a single mounting strip showing the slotted construction.
Fig. 3 is a perspective view of a single unslotted, mounting strip such as is used in the alternative method described.

With reference to Figs. 1 and 2, each strip 11 is made of transparent plastic, such as methyl methacrylate, commonly known as plexi-glass. However, any similar thermoplastic substance may be used. Each strip contains a plurality of slots 12 on both its top and bottom sides.

Fig. 1 shows the two plastic strips 11 with circuit elements mounted, the elements shown being fixed resistors 13. To accomplish this, the two strips 11 are put in an upright position, resting on their long edges 14. The strips are spaced apart at any desired distance, and are positioned so that the corresponding slots on both the bottom and top edges are transversely aligned. Two leads 15 of each resistor 13 to be mounted are laid in each pair of corresponding slots on the top side. Heat is then applied by a hot point or similar means to the two corners 16 of the plastic at the upper part of each slot 12. This heating serves to melt the plastic at these points and force it over the leads 15, thus effectively sealing them into the plastic strips.

After the plastic has hardened sufficiently, the assembly is turned over so that what were the bottom edges of the two strips are now on top. Another group of resistors or other circuit elements 13 have their leads 15 placed in corresponding slots in these present top edges and sealed in as previously described. There is now obtained a mounting assembly having two layers of circuit components.

Figure 4:
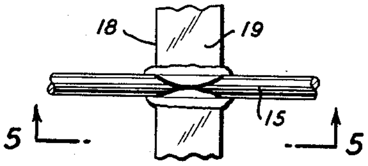
Fig. 4 is a top plan view showing a lead heat-sealed into an unslotted mounting strip by the alternative method.
Figure 5:
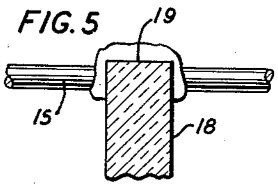
Fig. 5 is a sectional view taken along the line 5—5 of Fig. 4.

An alternative method of mounting the resistors involves the use of two plain unslotted strips of plastic 18 as shown in Fig. 3. Except for being unslotted, these strips are similar to strips 11. In this method, the two plain strips 18 are placed in an upright position, resting on their long edges 19 and are transversely aligned and spaced. The leads 15 of the resistors to be mounted, instead of being placed in slots, are laid on top of the two edges in the desired postions, and are held in place by a jig or other suitable method. These leads 15 are then sealed into the plastic strips at their respective locations by the application of heat in the vicinity of each location, as shown in Figs. 4 and 5.

After sufficient hardening of the plastic, the assembly is turned over, and a second layer of resistors is mounted on the top edges and sealed in the same manner as was the first layer.

In addition to its simplicity and low cost, this new method of mounting on two separate strips enables a larger number of components to be mounted in the same space than was formerly possible since two layers are mounted instead of one. The first layer of components serves as a base to space the two plastic strips properly and to give rigidity to the assembly while the second layer is being mounted. Extreme flexibility in the method is made possible since the strips of plastic may be spaced at varying distances from each other, depending on the maximum required length of the components in a particular assembly.

Another advantage is the simplification of field maintenance, since the components can be removed from the plastic and replaced quickly by the application of heat at the sealing-in point. Still another feature of the present method is the aid given to making visual inspections of the assemblies by the transparency of the plastic.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An assembly of circuit components for use in electrical apparatus comprising two flat strips of thermo-plastic material disposed in spaced parallel relation face to face to each other, and a plurality of circuit components disposed between the strips and having leads extending from the ends thereof through and beyond the strips to serve as points of attachment for conductors connecting the components into circuits of apparatus, said leads being integrally sealed into the strips to form a rigid unitary assembly.

2. An assembly of circuit components for use in electrical apparatus, comprising two flat strips of thermo-plastic material disposed in spaced parallel relation face to face to each other and each having a plurality of transverse slots in at least one side thereof, and a plurality of circuit components disposed between the strips and each having two leads extending from the ends thereof through the slots in the strips and projecting beyond the strips to serve as points of attachment for conductors connecting the components into circuits of apparatus, said leads being heat sealed into the slots to form a rigid unitary assembly.

HERBERT R. GROSS.
HENRY R. MASSINGHAM.

REFERENCES CITED

The following references are of record in the file of this patent:

UNITED STATES PATENTS

| Number | Name | Date |
|---|---|---|
| 1,031,787 | Hallock | July 9, 1912 |
| 1,984,036 | Schwartzmann | Dec. 11, 1934 |
| 2,204,217 | Herringer | June 11, 1940 |
| 2,270,166 | Hiensch | Jan. 13, 1942 |
| 2,339,434 | Stehlik | Jan. 18, 1944 |
| 2,369,291 | Frank | Feb. 13, 1945 |
| 2,417,420 | Knapp | Mar. 18, 1947 |
| 2,444,037 | Fritschi | June 29, 1948 |
| 2,558,008 | Smith | June 26, 1951 |